United States Patent Office 3,206,480
Patented Sept. 14, 1965

3,206,480
DIBENZOFURANAMINES
Erik F. Godefroi, Beerse, Belgium, assignor to Parke, Davis & Company, Detroit, Mich., a corporation of Michigan
No Drawing. Original application Apr. 12, 1960, Ser. No. 21,578, now Patent No. 3,159,677, dated Dec. 1, 1964. Divided and this application July 8, 1964, Ser. No. 381,250
5 Claims. (Cl. 260—346.2)

This application is a division of my copending application Serial No. 21,578, filed April 12, 1960, now U.S. Patent 3,159,677, which application is a continuation-in-part of application Serial No. 811,018, filed May 5, 1959, now abandoned.

The present invention is concerned with 5a,6,7,8,9,9a-hexahydro-9a-dibenzofuranamines, with substituted derivatives thereof, with acid-addition salts thereof, and with methods for their production.

The novel compounds of this invention can be represented as their free bases by the structural formula

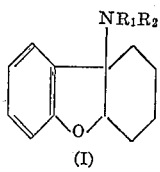

(I)

In Formula I, $R_1$ represents hydrogen, lower alkyl, or lower alkoxyalkyl, and $R_2$ represents lower alkyl. When either $R_1$ or $R_2$ is a lower alkyl radical, it is selected from among alkyl radicals containing not more than 6 carbon atoms and is preferably methyl or ethyl. When $R_1$ is a lower alkoxyalkyl radical, it is selected from among alkoxyalkyl radicals containing not more than 6 carbon atoms and is preferably an alkoxyethyl or an alkoxypropyl radical.

The free bases of the foregoing formula form acid-addition salts with a variety of inorganic and organic acids. Pharmaceutically-acceptable salts are formed by the reaction of the free bases with such acids as hydrochloric, hydrobromic, hydriodic, sulfuric, acetic, benzoic, citric, maleic, malic, gluconic, ascorbic and related acids. The salt formation is suitably carried out by reacting the selected base with the selected acid in an unreactive solvent. The acid-addition salts can be converted to the free bases by reaction with a base such as sodium hydroxide or potassium hydroxide. In the applications of this invention the compounds can be employed either as free bases or in the form of acid-addition salts. The acid-addition salts are preferred where greater water solubility is desired.

In one of the methods for the production of compounds of this invention, a compound of the formula

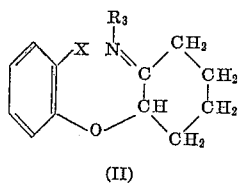

(II)

wherein X represents halogen, preferably bromide or iodine, and $R_3$ represents lower alkyl, or lower alkoxyalkyl, is reacted with a reactive organometallic compound capable of causing halogen-metal interchange and subsequent ring closure. The preferred organometallic compound is butyllithium although other lithium derivatives such as phenyllithium and propyllithium as well as organometallic derivatives of alkali metals and alkaline earth metals such as sodium, potassium and magnesium can also be used, generally with somewhat poorer results. The initial phase of the reaction is carried out under anhydrous conditions in a non-hydroxylic solvent such as an ether or a hydrocarbon, at a temperature below 0° C. and preferably in the range of —40 to —80° C. in the case of butyllithium. Under these conditions, substitution of the halogen atom by the metal occurs. The reaction is completed by warming the mixture above 0° C., preferably to room temperature or to the reflux temperature of the solvent, and treating the mixture with water or an aqueous medium to hydrolyze the organometallic derivative resulting from ring closure. The product obtained in this manner is the secondary amine of the formula

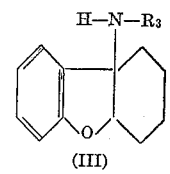

(III)

wherein $R_3$ is as defined before.

The N-substituted-2-(o-halophenoxy)cyclohexanimines of formula II that are employed as starting materials in the foregoing process can be prepared by the reaction sequence which comprises reacting the sodium salt of an o-halophenol with a 2-halocyclohexanone followed by reacting the resulting 2-(o-halophenoxy)cyclohexanone of the formula,

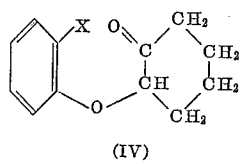

(IV)

where X is as defined before, with a primary amine.

In the preparation of the imines employed as starting materials, it is not necessary and usually not desirable that they be purified prior to use. It is satisfactory to conduct the reaction of the ketone with the selected primary amine and to determine the purity of the resulting crude imine by infrared absorption. The progress of the reaction of the ketone with the primary amine is indicated by the disappearance of ketone absorption at about 5.8 microns and the appearance of imine absorption at about 6.07 microns. A product exhibiting strong absorption in the region of 6.07 microns and only weak residual absorption in the range of 5.8 microns characterizes an imine suitable for use as a starting material in the practice of the invention.

In a second method of production of compounds of this invention, secondary and tertiary amines having in free base form the formula

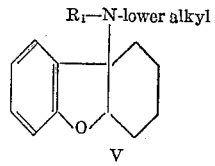

V are produced by the alkylation of primary and secondary amines having in free base form the formula

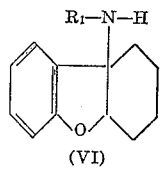

(VI)

wherein $R_1$ is as defined before. The alkylation can be carried out directly by reaction with an alkylating agent such as an alkyl halide or sulfate. Methylation can be accomplished by reaction with a mixture of formaldehyde and formic acid. The alkylation can also be carried out in a step-wise fashion by first acylating the amine with an acylating agent such as a carboxylic acid anhydride or halide followed by reducing the carbonyl group in the resulting amido compound. The reduction is preferably carried out by reaction with lithium aluminum hydride in a non-hydroxylic medium, preferably an ether or a hydrocarbon, followed by decomposition of the product with an aqueous medium. The alkylation to monoalkylamino compounds can also be achieved by reductive alkylation of the primary amino compounds. Such a reductive alkylation can be carried out by reacting the primary amino compound with an aldehyde or ketone and subjecting the reaction mixture to catalytic hydrogenation.

The compounds of this invention are useful pharmacological agents. They are central nervous system depressants which exhibit a variety of effects. At low dosages, they produce euphoria and at somewhat higher dosages they exhibit anticonvulsant and cataleptoid properties. They are also useful in the treatment of states of hyper-excitability and in the production of anesthesia. In combination with barbiturates they enhance the anesthetic effect of the latter compounds with a lessening of respiratory depression. The compounds of the invention are orally active and exhibit their useful depressant activities upon either oral or parenteral administration.

The invention is illustrated by the following examples:

EXAMPLE 1

To a freshly-prepared solution of 16 g. of butyllithium in 250 ml. of ether, cooled to $-65°$ C., is added a solution of 35.6 g. of N-methyl-2-(o-bromophenoxy)cyclohexanimine in 50 ml of ether. The temperature is maintained at about $-65°$ C. for 10 minutes following which the mixture is diluted with 300 ml. of ether, allowed to warm to room temperature, maintained at room temperature for 2 hours and then cautiously treated with an excess of water. Efficient stirring is maintained throughout these operations. The separated organic phase is washed with water, and extracted with several portions of dilute hydrochloric acid. The combined aqueous acidic extracts are made basic with sodium hydroxide and the liberated organic free base is removed by extraction with several portions of ether. The ether extract is made anhydrous and evaporated to yield a residue of N-methyl-5a,6,7,8,9,9a-hexahydro-9a-dibenzofuranamine; B.P. about 87–93° C. at 0.15 mm. A solution of this free base in ether is treated with approximately one equivalent of hydrogen chloride in isopropyl alcohol. The precipitated hydrochloride is recrystallized from a mixture of methanol and ether; M.P. about 199–200° C. The hydrobromide is obtained by treating a solution of the free base in ether with hydrogen bromide.

EXAMPLE 2

To a solution of 12.8 g. of butyllithium in 200 ml. of ether at $-65°$ C. is added a solution of 29.6 g. of N-ethyl-2-(o-bromophenoxy)cyclohexanimine in 25 ml. of ether. With continuous stirring, the solution is maintained at about $-65°$ C. for 10 minutes, diluted with 250 ml. of ether, allowed to warm to room temperature, maintained at room temperature for 2 hours and treated cautiously with an excess of water. The ethereal phase is washed with water and concentrated to a small volume. It is then extracted with several portions of dilute hydrochloric acid and the combined aqueous acidic extracts are made basic with sodium hydroxide. The organic base is extracted with ether. The ether extract is dried and evaporated to yield a residue of N-ethyl-5a,6,7,8,9,9a-hexahydro-9a-dibenzofuranamine. A solution of the free base in ether is treated with approximately one equivalent of hydrogen chloride in isopropyl alcohol. The precipitated hydrochloride is recrystallized from a mixture of methanol and ether; M.P. about 184–186° C.

EXAMPLE 3

A solution of 12.8 g. of butyllithium in 200 ml. of ether is chilled to $-65°$ C. and to it is added a solution of 31 g. of N-propyl-2-(o-bromophenoxy)cyclohexanimine in 25 ml. of ether. The reaction mixture is kept at about $-65°$ C. for 10 minutes after which it is diluted with 250 ml. of ether and allowed to warm to room temperature. The mixture is stirred throughout these operations and for an additional two hours at the end of which time it is cautiously treated with an excess of water. The separated ethereal solution is washed with water, concentrated to a small volume and extracted with several portions of dilute hydrochloric acid. The combined aqueous acidic extracts are made basic with sodium hydroxide and the liberated organic base is removed by extraction with several portions of ether. Evaporation of the dried ether extract yields a residue of N-propyl-5a,6,7,8,9,9a-hexahydro-9a-dibenzofuranamine. Addition of 1 equivalent of hydrogen chloride in isopropyl alcohol to a solution of the free base in ether affords the hydrochloride; M.P. 181–182° C. after recrystallization from a mixture of methanol and ether.

EXAMPLE 4

To a stirred solution of 12.8 g. of freshly prepared butyllithium in 200 ml. of ether, chilled to $-65°$ C., is added 25 g. of N-(3-methoxypropyl)-2-(o-bromophenoxy)cyclohexanimine in 25 ml. of ether. Following the addition, the temperature rises to about $-45°$ C. The mixture is again chilled to $-65°$ C., maintained at that temperature for 20 minutese, diluted with 300 ml. of ether and allowed to warm to room temperature. It is stirred at room temperature for an additional two hours and then decomposed by the cautious addition of water. The separated ethereal phase is washed with water and concentrated to a residual oil. A solution of this oil in 50 ml. of fresh ether is extracted with three portions of 3-normal hydrochloric acid. The acidic extract is made distinctly basic with sodium hydroxide and extracted with 3 portions of ether. This ethereal extract is made anhydrous and evaporated to yield a residue of N-(3-methoxypropyl) - 5a,6,7,8,9,9a-hexahydro-9a-dibenzofuranamine. The hydrochloride is obtained by adding one equivalent of hydrogen chloride in isopropyl alcohol to a solution of the free base in ether. After recrystallization from a mixture of methanol and ether, it melts at about 156–157° C.

EXAMPLE 5

A reaction mixture prepared from 8.5 g. of N-methyl-5a,6,7,8,9,9a-hexahydro-9a-dibenzofuranamine, 50 ml. of methylene dichloride and 4.8 g. of acetic anhydride is allowed to stand at room temperature for 18 hours. The mixture is washed with one equivalent of 3-normal hydrochloric acid, then with dilute sodium bicarbonate solution until slightly basic. The dried methylene dichloride phase is evaporated to yield a residue of N-acetyl-N-methyl-5a,6,7,.8,9,9a-hexahydro-9a-dibenzofuranamine. A solution of this residue in 30 ml. of anhydrous ether is gradually added to a stirred solution of 5 g. of lithium aluminum hydride in 400 ml. of anhydrous ether. The mixture is stirred for 18 hours and then decomposed by the successive addition of 5 ml. of water, 3.75 ml. of 20% sodium hydroxide solution and 7.5 ml. of water. The mixture is filtered and a slight excess of hydrogen chloride in isopropyl alcohol is added to the filtrate. The precipitated N-ethyl-N-methyl-5a,6,7,8,9,9a-hexahydro - 9a - dibenzofuranamine hydrochloride is recrystallized from a mixture of methanol and ether; M.P. about 138–139° C. The free base is obtained by treating an aqueous solution of the hydrochloride with sodium hydroxide and extracting with ether. A citrate is obtained by adding a solution of citric acid in methanol to a solution of the free base in methanol and concentrating.

Starting materials

N-substituted-2-(o-halophenoxy)cyclohexanimines used as starting materials in the practice of the invention can be obtained by the reaction of a primary amine, such as a lower alkylamine or a lower alkoxyalkylamine with a 2-(o-halophenoxy)cyclohexanone. Specific examples showing the application of this method are disclosed in my copending application, Serial No. 21,578, filed April 12, 1960, now U.S. Patent No. 3,159,677, which application is a continuation-in-part of application Serial No. 811,018, filed May 5, 1959, now abandoned.

I claim:

1. A member of the class consisting of free bases of the structural formula

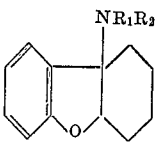

and pharmaceutically-acceptable acid-addition salts thereof; where $R_1$ is a member of the class consisting of hydrogen, lower alkyl, and lower alkoxyalkyl; and $R_2$ is lower alkyl.

2. A compound of the structural formula

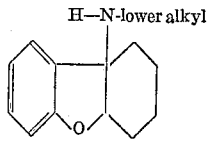

3. N-methyl-5a,6,7,8,9,9a-hexahydro-9a-dibenzofuranamine.

4. A pharmaceutically-acceptable acid-addition salt of N-(lower alkyl)-5a,6,7,8,9,9a-hexahydro-9a-dibenzofuranamine.

5. N-methyl-5a,6,7,8,9,9a-hexahydro-9a-dibenzofuranamine hydrochloride.

No references cited.

NICHOLAS S. RIZZO, *Primary Examiner.*